(12) United States Patent
Eksilioglu et al.

(10) Patent No.: US 8,858,906 B2
(45) Date of Patent: Oct. 14, 2014

(54) PROCESS FOR REMOVAL OF CARBON DIOXIDE FROM A GAS

(75) Inventors: Ayhan Eksilioglu, Arnhem (NL); Frank Haiko Geuzebroek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 195 days.

(21) Appl. No.: 12/921,533

(22) PCT Filed: Mar. 11, 2009

(86) PCT No.: PCT/EP2009/052852
§ 371 (c)(1),
(2), (4) Date: Oct. 7, 2010

(87) PCT Pub. No.: WO2009/112518
PCT Pub. Date: Sep. 17, 2009

(65) Prior Publication Data
US 2011/0020203 A1 Jan. 27, 2011

(30) Foreign Application Priority Data
Mar. 13, 2008 (EP) ..................................... 08102564

(51) Int. Cl.
*B01D 53/62* (2006.01)
*B01D 53/78* (2006.01)
*B01D 53/96* (2006.01)
*B01D 53/34* (2006.01)
*B01D 53/14* (2006.01)

(52) U.S. Cl.
CPC .......... *B01D 53/1425* (2013.01); *B01D 53/343* (2013.01); *Y02C 10/06* (2013.01); *B01D 53/1475* (2013.01); *B01D 53/62* (2013.01); *Y02C 10/04* (2013.01)

USPC ............................. 423/228; 423/220; 423/226

(58) Field of Classification Search
USPC .................................. 423/220, 226, 228, 229
See application file for complete search history.

(56) References Cited

U.S. PATENT DOCUMENTS

| 5,832,712 A | 11/1998 | Ronning et al. ............. 60/39.02 |
| 5,911,916 A * | 6/1999 | Minevski et al. ............. 252/391 |
| 6,036,888 A | 3/2000 | Minevski ....................... 252/395 |
| 2005/0132884 A1* | 6/2005 | Xu et al. ......................... 95/236 |

(Continued)

FOREIGN PATENT DOCUMENTS

| EP | 0165758 | 6/1985 | .............. B62D 5/30 |
| EP | 1813343 | 8/2007 | ............ B01D 53/14 |

(Continued)

OTHER PUBLICATIONS

Kohl, Arthur L. et al., "Gas Purification (5th Ed.)." Gulf Publishing Co., 1997 (Chapter 14, pp. 1188-1210).*

*Primary Examiner* — Stanley Silverman
*Assistant Examiner* — Daniel Berns

(57) ABSTRACT

The invention provides a process for the removal of $CO_2$ from a gas, the process comprising the steps of: (a) removing $CO_2$ from the gas by contacting the gas with absorbing liquid in an absorber to obtain absorbing liquid enriched in $CO_2$ and a purified gas; (b) heating absorbing liquid enriched in $CO_2$ (c) contacting heated absorbing liquid enriched in $CO_2$ with a stripping gas at elevated temperature in a regenerator to obtain regenerated absorbing liquid and a hot gas stream enriched in $CO_2$ wherein at least part of the absorbing liquid enriched in $CO_2$ is heated through external heat exchange with the hot gas stream enriched in $CO_2$.

14 Claims, 1 Drawing Sheet

(56) References Cited

U.S. PATENT DOCUMENTS

2006/0032377 A1   2/2006   Reddy et al. .................... 96/234
2007/0213415 A1*  9/2007   Sarlis ............................. 521/27
2010/0229723 A1*  9/2010   Gelowitz et al. ............... 95/162

FOREIGN PATENT DOCUMENTS

| WO | WO9521683 | 8/1995 | ............. B01D 53/14 |
| WO | EP1695756 | 8/2006 | ............. B01D 53/14 |
| WO | WO2008144918 | 12/2008 | ............. B01D 53/14 |

* cited by examiner

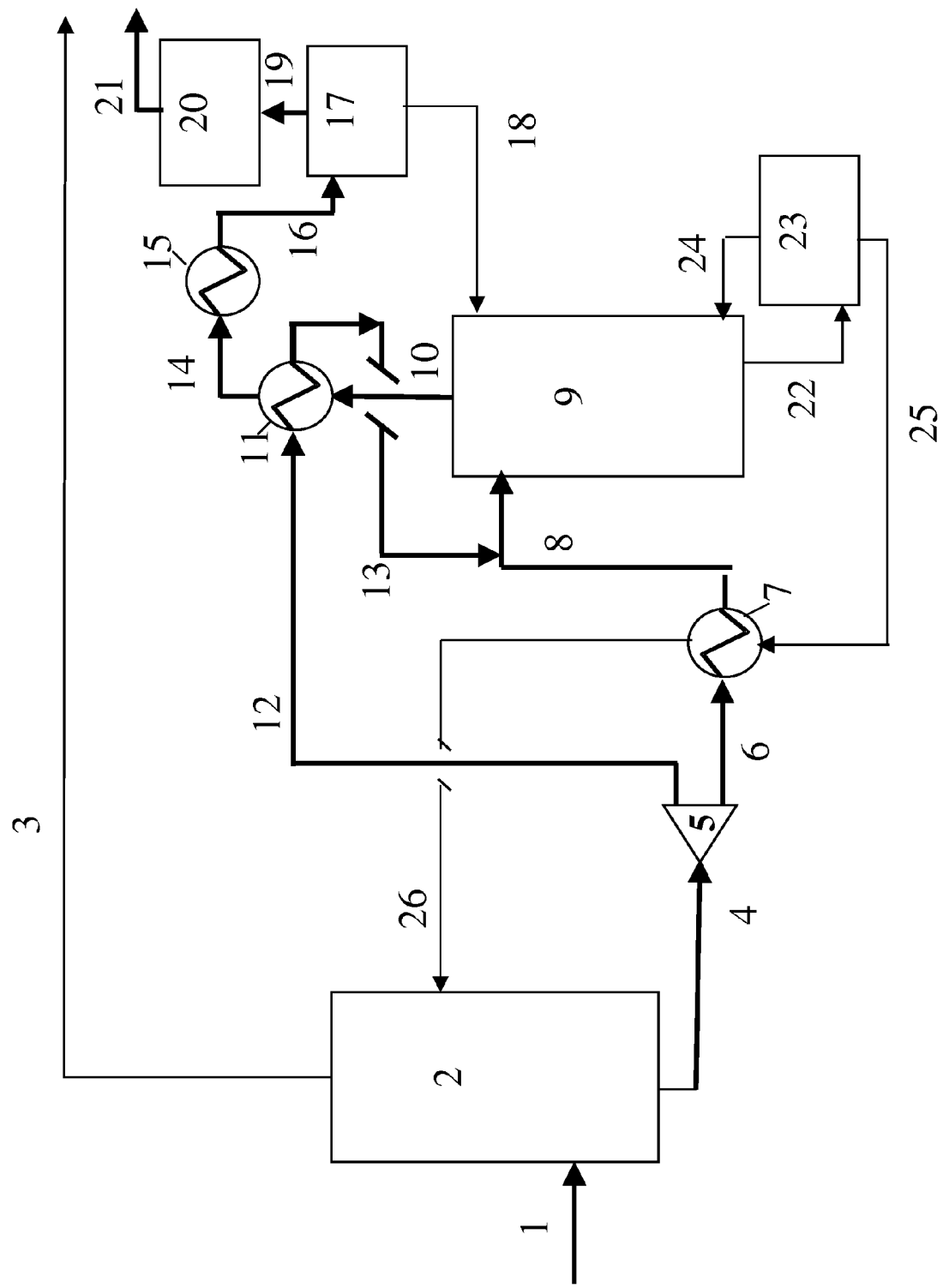

PROCESS FOR REMOVAL OF CARBON DIOXIDE FROM A GAS

The present application claims priority from European Patent Application 08102564.5 filed 13 Mar. 2008.

The invention relates to a process for removal of carbon dioxide ($CO_2$) from a gas.

During the last decades there has been a substantial global increase in the amount of $CO_2$ emission to the atmosphere. Emissions of $CO_2$ into the atmosphere are thought to be harmful due to its "greenhouse gas" property, contributing to global warming. Following the Kyoto agreement, $CO_2$ emission has to be reduced in order to prevent or counteract unwanted changes in climate. The largest sources of $CO_2$ emission are combustion of fossile fuels, for example coal or natural gas, for electricity generation and the use of petroleum products as a transportation and heating fuel. These processes result in the production of gases comprising $CO_2$. Thus, removal of at least part of the $CO_2$ prior to emission of these gases into the atmosphere is desirable.

Processes for removal of $CO_2$ from gases are known in the art. For example, in EP 0,744,987 a process for removing and preventing emissions of $CO_2$ into the atmosphere is described. In the process described in EP 0,744,987, $CO_2$ is transferred from exhaust gas exiting a gas turbine to an absorption liquid, followed by regeneration at elevated temperatures to release absorbed $CO_2$ from the absorbing liquid. A severe drawback of the process described in EP 0,744,987 is the high energy consumption, leading to a lower overall energy output. To improve the efficiency, the exhaust gas exiting the gas turbine is passed through a heat recovery steam generator, producing high pressure steam and low pressure steam. The low pressure steam is used to achieve the elevated temperatures needed for the regeneration of the absorbing liquid. Although this results in a better overall efficiency, additional equipment is needed.

Thus, there remains a need for a simple, energy-efficient process for removal of $CO_2$ from gases.

To this end, the invention provides a process for the removal of $CO_2$ from a gas, the process comprising the steps of:
(a) removing $CO_2$ from the gas by contacting the gas with absorbing liquid in an absorber to obtain absorbing liquid enriched in $CO_2$ and a purified gas;
(b) heating absorbing liquid enriched in $CO_2$;
(c) contacting heated absorbing liquid enriched in $CO_2$ with a stripping gas at elevated temperature in a regenerator to obtain regenerated absorbing liquid and a hot gas stream enriched in $CO_2$; wherein at least part of the absorbing liquid enriched in $CO_2$ is heated through external heat exchange with the hot gas stream enriched in $CO_2$.

External heat exchange as used herein refers to the event that the hot gas stream enriched in $CO_2$ is led from the regenerator to at least one heat exchanger, wherein heat is recovered from the hot gas stream enriched in $CO_2$ and the heat recovered is used in the regeneration step.

The process enables simple and more energy-efficient removal of $CO_2$ using an absorbing liquid, because part of the heat requirement for warming the absorbing liquid enriched in $CO_2$ is provided by the hot gas stream enriched in $CO_2$. It is believed that the heat requirement is delivered by at least partly condsing the steam that is present in the hot gas stream enriched in $CO_2$. Suitably, the process leads to an improvement in the overall energy efficiency by 5 to 25%, preferably by 10 to 25%.

An embodiment of the present invention will now be described by way of example only, and with reference to the accompanying non-limiting drawing in which:

FIG. 1 is a scheme of a process for the removal of $CO_2$ from a gas according to one embodiment of the invention. For the purpose of this description, a single reference number will be assigned to a line as well as stream carried in that line.

In step (a), $CO_2$ is removed by contacting the gas with an absorbing liquid at elevated pressure, suitably in an absorber. In the figure, the gas is led via line 1 to absorber 2. Suitably, in the event that the gas is a flue gas, absorption takes place at relatively low temperature and relatively low pressure. Suitably, the gas is cooled prior to entering the absorber.

The process is suitable for any gas comprising $CO_2$. For example, the gases to be treated may be natural gas, synthesis gas, obtained for instance by (catalytic) partial oxidation and/or by steam methane reforming of hydrocarbons, e.g. methane, natural or associated gas, naphtha, diesel and liquid residual fractions, gases originating from coal gasification, coke oven gases, refinery gases, hydrogen and hydrogen containing gases, and flue gases.

Suitably, the gas comprises in the range of from 0.25 to 70% (v/v) of $CO_2$, preferably from 1 to 45% (v/v).

In the event that the gas is a flue gas, the amount of $CO_2$ will generally be lower, suitably from 0.25 to 20% (v/v) and the gas will usually also comprise oxygen, preferably in the range of from 0.25 to 20% (v/v), more preferably from 0.5 to 15% (v/v), still more preferably from 1 to 10% (v/v).

The absorbing liquid may be any absorbing liquid capable of removing $CO_2$ from a gas stream. Such absorbing liquids may include chemical solvents or combinations of chemical and physical solvents.

Suitable chemical solvents include ammonia and amine compounds.

One preferred absorbing liquid comprises one or more amines. It has been found that amines are especially suitable for removal of CO2 from gases.

The amines may be single primary or secondary or tertiary amines, preferably derived from ethanol amine, or may be mixtures of primary or secondary amines and/or tertiary amines.

Preferably, the one or more amines are selected from the group of monethanolamine (MEA), diethanolamine (DEA), diglycolamine (DGA), methyldiethanolamine (MDEA), triethanolamine (TEA), N,N'-di(hydroxyalkyl)piperazine, N,N,N',N'-tetrakis(hydroxyalkyl)-1,6-hexanediamine and tertiary alkylamine sulfonic acid compounds.

MEA is an especially preferred amine, due to its ability to absorb a relatively high percentage of $CO_2$ (volume $CO_2$ per volume MEA). Thus, an absorbing liquid comprising MEA is suitable to remove $CO_2$ from gases having low concentrations of $CO_2$, typically 3 to 10% (v/v) of $CO_2$.

Preferably, the N,N'-di(hydroxyalkyl)piperazine is N,N'-d-(2-hydroxyethyl)piperazine and/or N,N'-di-(3-hydroxypropyl)piperazine.

Preferably, the tetrakis(hydroxyalkyl)-1,6-hexanediamine is N,N,N',N'-tetrakis(2-hydroxyethyl)-1,6-hexanediamine and/or N,N,N',N'-tetrakis(2-hydroxypropyl)-1,6-hexanediamine.

Preferably, the tertiary alkylamine sulfonic compounds are selected from the group of 4-(2-hydroxyethyl)-1-piperazineethanesulfonic acid, 4-(2-hydroxyethyl)-1-piperazinepropanesulfonic acid, 4-(2-hydroxyethyl)piperazine-1-(2-hydroxypropanesulfonic acid) and 1,4-piperazinedi (sulfonic acid).

As especially preferred absorbing liquid comprises mixtures of a primary or secondary amine with a tertiary or a sterically hindered amine. Suitable tertiary or sterically hindered amines have been described hereinabove. The primary or secondary amine compound suitably has a pKb (at 25° C. in water) below 5.5, preferably below 5, more preferably below 4.5. A lower pKb results in improved process results in the form of increased $CO_2$ absorption. An especially preferred secondary amine is piperazine.

In the event that the gas stream comprises an appreciable quantity of oxygen, suitably in the range of from 1 to 20% (v/v) of oxygen, preferably a corrosion inhibitor is added to the absorbing liquid. Suitable corrosion inhibitors are described for example in U.S. Pat. No. 6,036,888.

It will be understood that the conditions used for absorption (step a) depend inter alia on the type of absorbing liquid used.

In the event that the absorbing liquid comprises an amine, step (a) is suitably carried out at a temperature between 15 and 90° C., preferably at a temperature of at least 20° C., more preferably between 25 and 80° C., still more preferably between 40 and 65° C., and even still mote preferably at about 55° C.

In the event that the absorbing liquid comprises ammonia, suitably the absorbing step is performed at temperatures below ambient temperature, preferably in the range of from 0 to 10° C., more preferably from 2 to 8° C.

In the event that the absorbing liquid comprises an amine, step (a) is suitably carried out at a pressure between 10 and 150 bar, especially between 25 and 90 bara.

Step (a) results in purified gas and absorbing liquid rich in $CO_2$. Suitably, more than 80%, preferably more than 90% and more preferably more than 95% of the $CO_2$ is removed. As the purified gas comprises low concentrations of $CO_2$, it may now be vented into the atmosphere, or used elsewhere.

In step (b), the absorbing liquid rich in $CO_2$ is heated, suitably using the regenerated absorbing liquid of step (c). This heating step effects that the absorbing liquid rich in $CO_2$ is brought to a temperature close to or in the range of the temperature at which regeneration of absorbing liquid rich in $CO_2$ will take place. Suitably, step (b) is performed via heat exchange of the absorbing liquid rich in $CO_2$ with a hot gas or liquid. As will be explained hereinafter, at least part of the heat requirements of step (b) are fulfilled using heat from a hot stripping gas comprising $CO_2$ generated in the regeneration step.

In step (c), the heated absorbing liquid rich in $CO_2$ (transferred via line 8 in the figure) is contacted with a stripping gas at elevated temperature in a regenerator (9 in the figure) to obtain regenerated absorbing liquid and a gas stream enriched in carbon dioxide. In the figure, the gas stream enriched in $CO_2$ is led from the regenerator via line 10 to a heat exchanger 11.

It will be understood that the conditions used for regeneration depend inter alia on the type of absorbing liquid and on the conditions used in the absorption step. Suitably, regeneration takes place at a different temperature and/or different pressure than the absorption. The regeneration step is suitably performed at temperatures higher than used in the absorption step.

In the event that the absorbing liquid comprises an amine, preferred regeneration temperatures are in the range of from 100 to 200° C. In the event that the absorbing liquid comprises an aqueous amine, regeneration preferably takes place at pressure in the range of from 1 to 5 bara.

When using an absorbing liquid comprising ammonia, the $CO_2$-enriched gas stream exiting the regenerator has an elevated pressure. Suitably, the pressure of the $CO_2$-enriched gas stream is in the range of from 5 to 30 bara, preferably from 8 to 30 bara. In applications where the $CO_2$-enriched gas stream needs to be at a high pressure, for example when it will be used for injection into a subterranean formation, it is an advantage that the $CO_2$-enriched gas stream is already at an elevated pressure. In a preferred embodiment, the pressurised $CO_2$-enriched gas stream is used for enhanced oil recovery, suitably by injecting it into an oil reservoir where it tends to dissolve into the oil in place, thereby reducing its viscosity and thus making it more mobile for movement towards the producing well. Normally, a series of compressors is needed to pressurise the $CO_2$-enriched gas stream to the desired high pressures. A $CO_2$-enriched gas stream which is already at elevated pressure is easier to further pressurise.

In the process, at least part of the absorbing liquid enriched in $CO_2$ is heated through heat exchange with the hot gas stream enriched in $CO_2$. This can be achieved in several ways. A preferred embodiment will be described in detail. It will however be understood that the invention is not limited to this preferred embodiment; many variations are possible and these are also comprised in the invention.

In the preferred embodiment, the absorbing liquid enriched in $CO_2$ is split into two fractions, as shown in the figure, wherein two streams are led via lines 6 and 12 from splitter 5. A first fraction of the absorbing liquid enriched in $CO_2$ is led to a first heat exchanger, 7 in the figure, thereby heating said first part of the absorbing liquid enriched in $CO_2$ using a regenerated absorption liquid. A second fraction of the absorbing liquid enriched in $CO_2$ is led to a second heat exchanger, 11 in the figure, thereby heating said second part of the absorbing liquid enriched in $CO_2$. The hot gas stream enriched in $CO_2$ is led to the second heat exchanger and used to heat the second part of the absorbing liquid enriched in $CO_2$ through heat exchange. Preferably, the first fraction is larger than the second fraction. The ratio between the first and the second fraction will depend inter alia on the absorbing liquid used, as different absorbing liquids will have different heat requirements. A preferred ratio between the first and second fraction of the absorbing liquid enriched in $CO_2$ is in the range of from 1:1 to 9:1, more preferably from 1:1 to 4:1, still more preferably about 7:3.

In the figure, gas comprising $CO_2$ is led via line 1 to absorber 2. In absorber 2, the gas is contacted with absorbing liquid, thereby transferring $CO_2$ from the gas to the absorbing liquid to obtain purified gas and absorbing liquid enriched in $CO_2$. The purified gas is led from the absorber via line 3. The absorbing liquid enriched in $CO_2$ is led from the absorber via line 4 to a splitter 5, where it is split into two streams.

A first stream is led via line 6 to a first heat exchanger 7, where it is heated. Resulting heated absorbing liquid enriched in $CO_2$ is led via line 8 to regenerator 9. In regenerator 9, heated absorbing liquid enriched in $CO_2$ is contacted as elevated temperature with a stripping gas, thereby transferring $CO_2$ from the absorbing liquid to the stripping gas to obtain regenerated absorbing liquid and hot stripping gas enriched in $CO_2$. The hot stripping gas enriched in $CO_2$ is led from the regenerator via line 10 to heat exchanger 11.

A second stream of absorbing liquid enriched in $CO_2$ is led from splitter 5 via line 12 to heat exchanger 11. In heat exchanger 11, the absorbing liquid enriched in $CO_2$ is heated against the hot stripping gas enriched in $CO_2$. The resulting heated absorbing liquid enriched in $CO_2$ is lead from heat exchanger 11 via line 13 to regenerator 9.

Cooled stripping gas enriched in $CO_2$ is led from heat exchanger 11 via line 14 to condenser 15, where water is condensed. The cooled stream is led via line 16 to separator 17, where condensed water is separated and led via line 18 to regenerator 9. The gas stream enriched in $CO_2$, depleted of water is led via line 19 to compressor 20, where it is pressurised. The pressurised $CO_2$ stream is led from the compressor via line 21 to be used elsewhere.

Regenerated absorbing liquid is withdrawn from the bottom of regenerator 9 via line 22 and led to a reboiler 23, where it is heated producing stripping steam and a regenerated absorption liquid. The stripping steam is led via line 24 to the regenerator. The hot regenerated absorbing liquid is led via line 25 to heat exchanger 7, where it is cooled against absorbing liquid comprising $CO_2$. Cooled regenerated absorbing liquid is led via line 26 to absorber 2.

The invention is illustrated using the following non-limiting examples.

EXAMPLE 1

According to the Invention

In a process as described in the Figure, a flue gas comprising 4.1% $CO_2$ is routed via line 1 to absorber column 2 with a flow rate of 499.1 Nm3/s. In the absorber, 85% of the $CO_2$ is absorbed. 18% of the $CO_2$-enriched solvent stream leaving the absorber 2 via line 4 is led via heat exchanger 11 to column 9. The remainder of the stream leaving absorber 2 via line 4 is led to heat exchanger 7. This results in a duty of reboiler 23 of 231.1 MW.

EXAMPLE 2

According to the Invention

The process as described above was repeated but now all solvent leaving the absorber 2 via line 4 is routed via heat exchanger 7 to regenerator 9. This results in duty of reboiler 23 of 253.3 MW.

Hence, the process enables a reduction in reboiler duty of about 9%.

What is claimed is:

1. A process for removing $CO_2$ from a gas, the process comprising the steps of:
   (a) removing $CO_2$ from the gas by contacting the gas with an absorbing liquid selected from either N,N'-di(hydroxyalkyl)piperazine, N,N,N',N'-tetrakis(hydroxyalkyl)-1,6-hexanediamine or tertiary alkylamine sulfonic acid compounds in an absorber to obtain an absorbing liquid enriched in $CO_2$ and a purified gas;
   (b) heating the absorbing liquid enriched $CO_2$ to obtain a heated absorbing liquid enriched in $CO_2$; and
   (c) contacting the heated absorbing liquid enriched in $CO_2$ with a stripping gas at an elevated temperature in a regenerator to obtain a regenerated absorbing liquid and a hot gas stream enriched in $CO_2$; wherein 30% of the absorbing liquid enriched in $CO_2$ is heated through external heat exchange with the hot gas stream enriched in $CO_2$.

2. A process according to claim 1, wherein the absorbing liquid enriched in $CO_2$ is split into a first part of absorbing liquid enriched in $CO_2$ and a second part of absorbing liquid enriched in $CO_2$; the first part of absorbing liquid enriched in $CO_2$ is led to a first heat exchanger, thereby heating the first part of absorbing liquid enriched in $CO_2$; the second part of absorbing liquid enriched in $CO_2$ is led to a second heat exchanger, thereby heating said second part of absorbing liquid enriched in $CO_2$; and the hot gas stream enriched in $CO_2$ is led to the second heat exchanger and used to heat the second part of absorbing liquid enriched in $CO_2$ through heat exchange.

3. A process according to claim 1, wherein the absorbing liquid further comprises a physical solvent.

4. A process according to claim 1, wherein the absorbing liquid comprises ammonia.

5. A process according to claim 1, wherein the pressure of the $CO_2$-enriched gas stream is in the range of from 5 to 30 bara.

6. A process according to claim 1, wherein the gas stream enriched in $CO_2$ is pressurised using a carbon dioxide compressor to produce a pressurised carbon dioxide stream.

7. A process according to claim 6, wherein the pressurised carbon dioxide stream is yielded to a process for enhanced oil recovery.

8. A process for removing $CO_2$ from a gas comprising $CO_2$, the process comprising:
   removing $CO_2$ from the gas by contacting the gas with an absorbing liquid, wherein the absorbing liquid comprises a compound selected from the group consisting of a N,N'-di(hydroxyalkyl)piperazine, a N,N,N',N'-tetrakis(hydroxyalkyl)-1,6-hexanediamine, and a tertiary alkylamine sulfonic acid compound, to obtain a $CO_2$-enriched absorbing liquid enriched and a purified gas
   heating the $CO_2$-enriched absorbing;
   stripping $CO_2$ from the $CO_2$-enriched absorbing liquid through contact with a striping gas at an elevated temperature to obtain a regenerated absorbing liquid and a $CO_2$-enriched stripping gas; and,
   heating 30% of the $CO_2$-enriched absorbing liquid through heat exchange with the $CO_2$-enriched stripping gas.

9. The process of claim 8, wherein the N,N'-di(hydroxyalkyl)piperazine is either N,N'-di-(2-hydroxyethyl)piperazine or N,N'-di-(3-hydroxypropyl)piperazine.

10. The process of claim 8, wherein the N—N—N'—N'-tetrakis(hydroxyalkyl)-1,6-hexanediamine is either N,N,N'N'-tetrakis(2-hydroxyethyl)-1,6-hexanediamine or N,N,N',N'-tetrakis(2-hydroxypropyl)-1-6-hexanediamine.

11. The process of claim 8, wherein the tertiary alkylamine sulfonic acid is selected from the group consisting of 4-(2-hydroxyethyl)-1-piperazineethanesulfonic acid, 4-(2-hydroxyethyl)-1-piperazinepropanesulfonic acid, 4-(2-hydroxyethyl)piperazine-1-(2-hydroxypropanesulfonic acid) and 1,4-piperazinedi(sulfonic acid).

12. The process of claim 8, wherein the gas further comprises oxygen and the absorbing liquid further comprises a corrosion inhibitor.

13. The process of claim 8, wherein the contacting of the gas with the absorbing liquid is performed at a temperature between 15° C. and 90° C.

14. The process of claim 8, wherein the $CO_2$-enriched stripping gas has a pressure between 10 bar and 150 bar.

* * * * *